(12) United States Patent  (10) Patent No.: US 8,717,491 B2
Koh                        (45) Date of Patent:    May 6, 2014

(54) AUTO FOCUSING METHOD, RECORDING MEDIUM FOR RECORDING THE METHOD, AND AUTO FOCUSING APPARATUS

(75) Inventor: Sung-shik Koh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 12/953,618

(22) Filed: Nov. 24, 2010

(65) Prior Publication Data

US 2011/0128640 A1    Jun. 2, 2011

(30) Foreign Application Priority Data

Dec. 2, 2009 (KR) .................. 10-2009-0118462

(51) Int. Cl.
  *H04N 5/232* (2006.01)
  *G03B 13/00* (2006.01)

(52) U.S. Cl.
  USPC .......................................... 348/349

(58) Field of Classification Search
  USPC .......................................... 348/349
  See application file for complete search history.

(56) References Cited

U.S. PATENT DOCUMENTS

| 6,654,053 | B1 | 11/2003 | Hwang |
| 7,916,206 | B2* | 3/2011 | Kikuchi ................. 348/349 |
| 7,929,801 | B2 | 4/2011 | Nakamura et al. |
| 7,941,042 | B2 | 5/2011 | Park et al. |
| 7,973,848 | B2 | 7/2011 | Koh |
| 2006/0056733 | A1* | 3/2006 | Minakuti et al. ........... 382/286 |
| 2006/0152617 | A1* | 7/2006 | Konishi .................... 348/345 |
| 2006/0232701 | A1 | 10/2006 | Ito et al. |
| 2009/0237552 | A1* | 9/2009 | Yuba ...................... 348/349 |
| 2011/0109764 | A1* | 5/2011 | Hong .................... 348/222.1 |

FOREIGN PATENT DOCUMENTS

| CN | 1172264 A | 2/1998 |
| CN | 101236294 A | 8/2008 |
| CN | 101243458 A | 8/2008 |
| CN | 101370087 A | 2/2009 |
| CN | 101387735 A | 3/2009 |
| JP | 2005-102199 A | 4/2005 |
| KR | 1020100013696 A | 2/2010 |

OTHER PUBLICATIONS

Office Action issued for CN 201010583589.4 (Jan. 6, 2014).

* cited by examiner

*Primary Examiner* — Albert Cutler
(74) *Attorney, Agent, or Firm* — Drinker Biddle & Reath LLP (57) ABSTRACT

An auto focusing method for improving an auto focusing speed by implementing auto focusing by determining a motion direction of the focus lens at a current position of the focus lens, a recording medium for recording the auto focusing method, and an auto focusing apparatus. The auto focusing method is implemented by determining a current position of a focus lens; determining whether a first image input at the current position of the focus lens has image blurring; if the current position of the focus lens is a position for long range focusing and the first image has image blurring, determining that a motion direction of the focus lens is toward longer range focusing; and if the current position of the focus lens is a position for long range focusing and the first image has image blurring, determining that the motion direction of the focus lens is toward closer range focusing.

20 Claims, 10 Drawing Sheets

AUTO FOCUSING METHOD, RECORDING MEDIUM FOR RECORDING THE METHOD, AND AUTO FOCUSING APPARATUS

CROSS-REFERENCE TO RELATED PATENT APPLICATION

This application claims the benefit of Korean Patent Application No. 10-2009-0118462, filed on Dec. 2, 2009, in the Korean Intellectual Property Office, the entire disclosure of which is incorporated herein by reference.

BACKGROUND

1. Field of the Invention

Embodiments of the invention relate to an auto focusing method, a recording medium for recording the auto focusing method, and an auto focusing apparatus.

2. Description of the Related Art

Digital photographing apparatuses often include an auto focusing function. Often, when a focus lens is moved to search for a high focus value, the focus lens moves through a large part of the possible positions of the focus lens. This may be time consuming and increase the amount of time to capture an image. This may frustrate the user of the digital photographing apparatus who may miss the opportunity to capture images and may become frustrated with waiting for the apparatus to auto focus.

SUMMARY

Therefore, there is a need in the art for an auto focusing method for increasing an auto focusing speed, a recording medium for recording the auto focusing method, and an auto focusing apparatus.

The auto focusing method including determining a current position of a focus lens; determining whether a first image input at the current position of the focus lens has image blurring; if the current position of the focus lens is a position for long range focusing and the first image has image blurring, determining that a motion direction of the focus lens is toward longer range focusing; and if the current position of the focus lens is a position for long range focusing and the first image has image blurring, determining that the motion direction of the focus lens is toward closer range focusing.

The auto focusing method may include if the current position of the focus lens is the close range position and the first image does not have image blurring, determining that the motion direction of the focus lens is toward closer range focusing; and if the current position of the focus lens is the long range position and the first image does not have image blurring, determining that the motion direction of the focus lens is toward longer range focusing.

Determining a current position of a focus lens may include calculating a distance between the current position of the focus lens and a subject; and if the distance is smaller than a reference distance, determining that the subject is positioned at a close distance, and if the distance is greater than the reference distance, determining that the subject is positioned at a far distance.

The auto focusing method may include if the subject is determined to be positioned at the far distance, then determining that the current position of the focus lens is the position for long range focusing, and if the subject is determined to be positioned at the close distance, then determining that the current position of the focus lens is the position for close range focusing.

The auto focusing method may include moving the focus lens in the determined motion direction; inputting a second image; determining whether the second image and the first image are the same scene images; if the second image and the first image are different scene images, determining whether the second image has image blurring; if the determined motion direction was toward longer range focusing and the second image has image blurring, determining that a second motion direction is toward closer range focusing; and if the determined motion direction was toward closer range focusing and the second image has image blurring, determining that a second motion direction is toward longer range focusing.

The auto focusing method may include if the determined motion direction was toward longer range focusing and the second image does not have image blurring, determining that a second motion direction is toward longer range position; and if the determined motion direction was toward closer range focusing and the second image does not have image blurring, determining that the second motion direction is toward closer range focusing.

The auto focusing method may include if it is determined that the first and second images are the same scene images, moving the focus lens within a predetermined range of the moved focus lens.

The auto focusing method may include moving the focus lens in the determined motion direction; determining a changed position of the moved focus lens; inputting a second image; determining whether the second image and the first image are the same scene images; if the second image and the first image are different scene images, determining whether the second image has image blurring; if the changed position of the moved focus lens is for long range focusing and the second image has image blurring, determining that a second motion direction of the focus lens is toward closer range focusing; and if the changed position of the moved focus lens is for close range focusing and the second image has image blurring, determining that the second motion direction of the focus lens is toward longer range focusing.

The auto focusing method may include If the changed position of the moved focus lens is for long range focusing and the second image does not have image blurring, determining that the second motion direction is toward longer range focusing; and if the changed position of the moved focus lens is for close range focusing and the second image does not have image blurring, determining that the second motion direction is toward closer range focusing.

The auto focusing method may include If it is determined that the first and second images are the same scene images, moving the focus lens within a predetermined range from the changed position of the moved focus lens.

A recording medium on which the auto focusing method of is recorded as a computer readable program code is disclosed.

According to another embodiment of the invention, there is provided an auto focusing apparatus including: a focus lens; a focus lens motor for driving the focus lens; a focus lens position determination unit for determining whether a current position of the focus lens is a long range position or a close range position; an image analyzing unit for determining whether a first image input at the current position of the focus lens has image blurring; a focus lens motion direction determination unit for determining that the motion direction of the focus lens is a direction allowing the focus lens to be in the long range position when the current position of the focus lens is the close range position and the first image has image blurring, and for determining that the motion direction of the focus lens is a direction allowing the focus lens to be in the close range position when the current position of the focus lens is the long range position and the first image has image blurring.

BRIEF DESCRIPTION OF THE DRAWINGS

The above and other features and advantages of embodiments of the invention will become more apparent by describing in detail exemplary embodiments thereof with reference to the attached drawings in which.

DETAILED DESCRIPTION

Auto focusing apparatuses, auto focusing methods, and recording media on which the auto focusing methods are recorded will be described with reference to the attached drawings.

Figure 1:
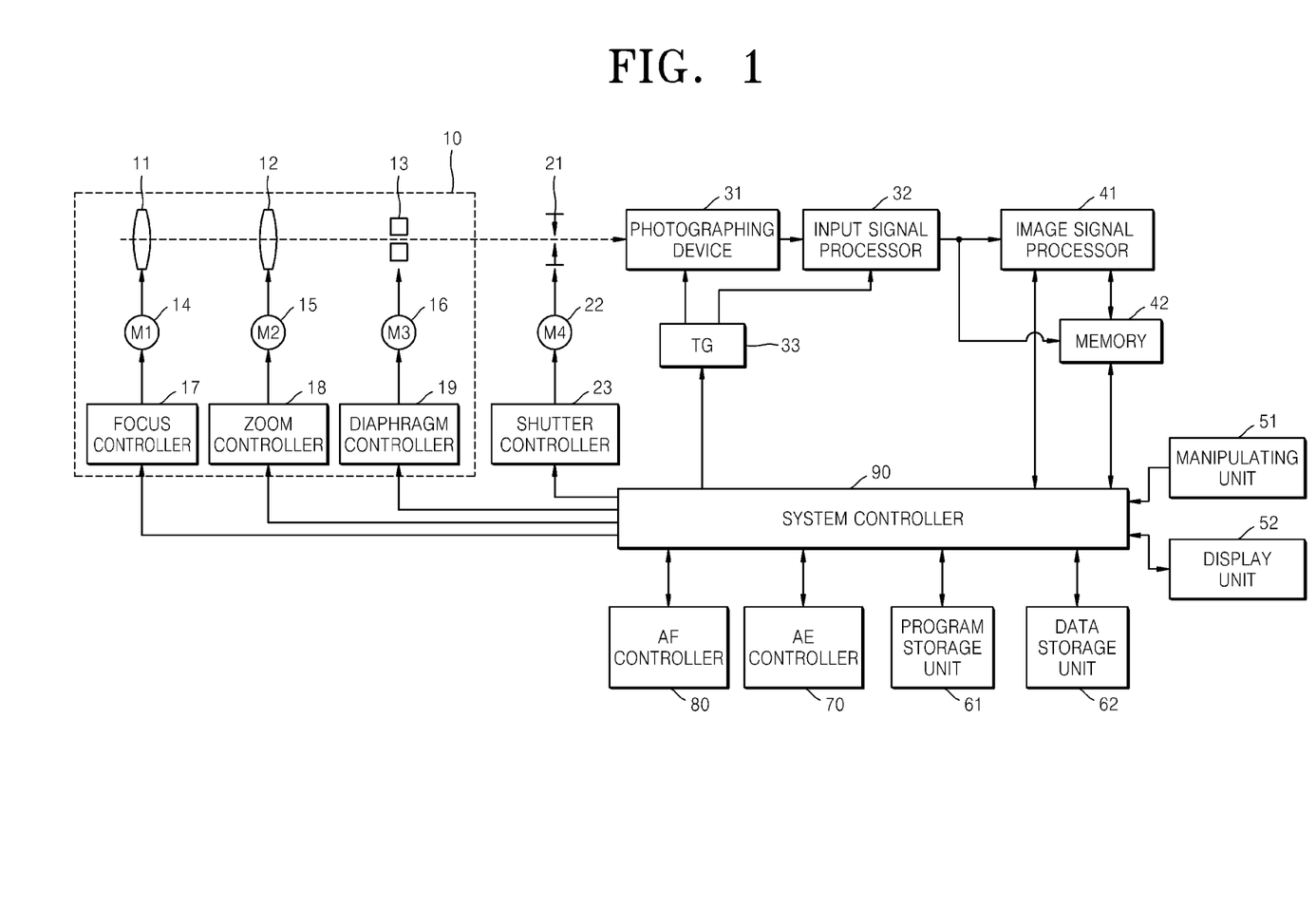
FIG. 1 is a block diagram of a digital photographing apparatus as an example of an auto focusing adjusting apparatus according to an embodiment of the invention.

FIG. 1 is a block diagram of a digital photographing apparatus as an example of an auto focusing adjusting apparatus according to an embodiment of the invention.

As an example of a digital image signal processing apparatus a digital camera will be described. However, the digital image signal processing apparatus is not limited to a digital camera. Other examples of a digital image signal processing apparatus include a camera phone including a digital image signal processing apparatus, a personal digital assistant (PDA), a portable multimedia player (PMP), a TV, and a digital device such as a digital frame.

Referring to FIG. 1, the digital camera includes an optical unit 10 for inputting an optical signal of a subject, a shutter 21, a photographing device 31 for converting the optical signal input by the optical unit 10 and the shutter 21 into an electrical signal, and an input signal processor 32 for processing the electrical signal corresponding to one frame image transmitted by the photographing device 31, for example, for reducing noise or converting the electrical signal into a digital signal. The digital camera may also include a timing generator (TG) 33 for supplying a timing signal to the photographing device 31 and the input signal processor 32. The digital camera may also include an image signal processor 41 for implementing image signal processing on image data transmitted by the input signal processor 32. Although the image data may be input to the image signal processor 41 in real time, if necessary, the image data may be temporally stored in a memory 42 and then supplied to the image signal processor 41. The digital camera may also include a manipulating unit 51 for inputting a manipulating signal input by a user, a display unit 52 for displaying an image, a program storage unit 61 for storing a program related to the operation of the digital camera, and a data storage unit 62 for storing image data and predetermined information. The digital camera may also include an auto exposure (AE) controller 70 for deducing exposure information of an input image and automatically controlling exposure according to the deduced exposure information. The digital camera may also include an auto focus (AF) controller 80 for automatically controlling focus with respect to an input image. The AF controller 80 is described below. The digital camera may also include a system controller 90 for controlling all of the components of the digital camera according to a manipulating signal input by a user or according to an input image.

Although in the current embodiment, each component is represented by one separate block, other structures may also be used. For example, two or more components may form a single chip. In addition, a component may be embodied as two or more chips.

Hereinafter, the respective components of the digital photographing apparatus will be described in detail.

The optical unit 10 may include a focus lens 11 for focusing a subject, a zoom lens 12 for narrowing or widening a viewing angle according to a focal length, and a diaphragm 13 for controlling the intensity of the optical signal, that is, the amount of light. Each of the zoom lens 11 and the focus lens 12 may consist of a single lens or a group of lens.

The optical unit 10 may also include a motor M1 14 for driving the focus lens 11, a motor M2 15 for driving the zoom lens 12, and a motor M3 16 for driving opening or closing of the diaphragm 13. The motor M1 14 controls the position of the focus lens 11 in correspondence to a driving signal transmitted by a focus controller 17, the motor M2 15 controls the position of the zoom lens 12 in correspondence to a driving signal transmitted by a zoom controller 18, and the motor M3 16 controls the position of the diaphragm 13 in correspondence to a driving signal transmitted by a diaphragm controller 19. The focus controller 17, the zoom controller 18, and the diaphragm controller 19 may be controlled by the system controller 90.

The shutter 21 may control inputting of an optical signal that has passed through the optical unit 10. The shutter 21 may be a mechanical shutter that includes a screen moving up and down. Alternatively, instead of a separate shutter, a shutter function may be performed by controlling supply of an electrical signal to the photographing device 31. If the shutter 21 is a mechanical shutter, the digital photographing apparatus may include a motor M4 22 for driving the shutter 21, and a shutter controller 23 for supplying a driving signal to the motor M4 22. The shutter controller 23 may also generate a driving signal in correspondence to a control signal supplied by the system controller 90.

The photographing device 31 receives an optical signal input by the optical unit 10 and forms an image of a subject. Examples of the photographing device 31 include a complementary metal oxide semiconductor (CMOS) sensor array and a charge coupled device sensor array (CCD). The photographing device 31 may provide image data corresponding to one frame image in correspondence to a timing signal supplied by the TG 33.

The input signal processor 32 may include a circuit for implementing signal-processing for gain control or normalization of waveforms of an electrical signal supplied by the photographing device 31, wherein the electrical signal supplied by the photographing device 31 is an analog signal. The input signal processor 32 may also include a circuit for converting the electrical signal that is an analog signal into a digital signal in order to generate image data corresponding to one frame image. The signal processing may be performed on one frame image in correspondence to a timing signal supplied by the TG 33.

The image signal processor 41 may operate to improve image quality by performing noise reduction with respect to input image data, gamma correction, color filter array interpolation, color matrix processing, color correction, or color enhancement. In addition, the image data that is generated by image-signal-processing for improving image quality may be compressed to form an image file, or image data may be restored from the image file. The image data may be reversibly or irreversibly compressed. An appropriate compression format may be, for example, a joint photographic experts group (JPEG) format or a JPEG 2000 format. The compressed image file may be stored in the data storage unit 62. In addition, the image signal processor 41 may operate a functionally non-distinction correction process, a color process, a blur process, an edge enhancement process, an image interpretation process, an image recognition process, or an image effect process. The image recognition process may be a face recognition process or a scene recognition process. Furthermore, the image signal processor 41 may operate a display image signal process for displaying an image on the display unit 52. For example, the image signal processor 41 may operate image generation and image synthesis process such as brightness level control, color correction, contrast control, outline enhancement control, an image division process, or character image creation. The image signal processor 41 may be connected to an external monitor, and may perform a predetermined image signal process and transmit the processed image data so that an image corresponding to the processed image data is displayed on the external monitor.

The image data supplied by the input signal processor 32 may be transmitted to the image signal processor 41 in real time. However, when a transmission rate is different from a computing process rate of the image signal processor 20, the image data may be temporally stored in the memory 42 and then supplied to the image signal processor 41. The memory 42 may be a memory device such as a synchronous dynamic random access memory (SDRAM), a multi-chip package (MCP) memory, or a dynamic random access memory (DRAM).

The manipulating unit 51 may include a part for setting when a user manipulates the digital photographing apparatus or takes a picture. For example, the manipulating unit 51 may include a button, a key, a touch panel, a touch screen, or a dial. In addition, the manipulating unit 51 may also be used to input manipulation signals by a user, for example, a manipulation signal for turning on or off, a manipulation signal for beginning or stopping photographing, a manipulation signal for playback beginning, stopping, or searching, a manipulation signal for driving an optical system, a manipulation signal for changing modes, a manipulation signal for menu manipulation, or a manipulation signal for selection manipulation.

The processed image data is transmitted to the display unit 52 and embodied as a corresponding image. The display unit 52 may be a display device such as a liquid crystal display (LCD), an organic light emitting diode (OLED), a plasma display panel (PDP), or an electronic display device (EDD).

The program storage unit 61 may store an operating system (OS) for operating the digital photographing apparatus, or an application program. The program storage unit 10 may be an electrically erasable programmable read-only memory (E2PROM), a flash memory, or a ROM.

The image data processed by the image signal processor 41 may be stored in the data storage unit 62. The data storage unit 62 may be installed in the digital photographing apparatus or may be embodied as an apparatus that may be attached and detached from the digital photographing apparatus. For example, the data storage unit 62 may be a SDcard/MMC, a hard disk driver (HDD), an optical disc, an optical magnetic disc, or a hologram memory.

In addition, the digital photographing apparatus may also include the AE controller 70 for automatically controlling exposure of an input image. The AE controller 70 may calculate an AE evaluation value based on a brightness value of image data supplied by the image signal processor 41, and according to the AE evaluation value, an exposure amount of the diaphragm 13 or an opening or closing rate of the shutter 21 may be calculated. The AE controller 70 may output control signals corresponding to the calculated exposure amount and shutter speed to a diaphragm controller 19 and a shutter controller 23, respectively. Each of the diaphragm controller 19 and the shutter controller 23 generates a driving signal in correspondence to a control signal transmitted by the AE controller 70. The diaphragm controller 19 and the shutter controller 23 transmit the generated driving signals to the corresponding motors M3 16 and M4 22. In addition, the AE controller 70 controls exposure according to an exposure time, gain, or a read mode of the photographing device 31. The gain is used to calculate a contrast value. The read mode of the photographing device 31 may be, for example, a signal process mode when the photographing device 31 reads image data. That is, when the image of a subject is dark, pixels may be added, and on the other hand, when the image of a subject is bright, all pixels are read.

The digital camera may also include the AF controller 80 for automatically controlling a focus with respect to an input image. The AF controller 80 will be described in below.

The system controller 90 may control the respective components according to a program stored in the program storage unit 61, a manipulation signal input by a user through the manipulating unit 51, an input image, or an image process result generated by the image signal processor 41.

Figure 2:
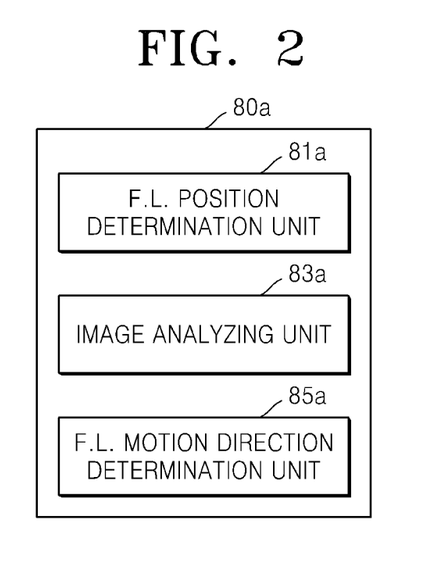
FIG. 2 is a block diagram of an example of an auto focus (AF) controller of the digital photographing apparatus of FIG. 1.
Figure 3:
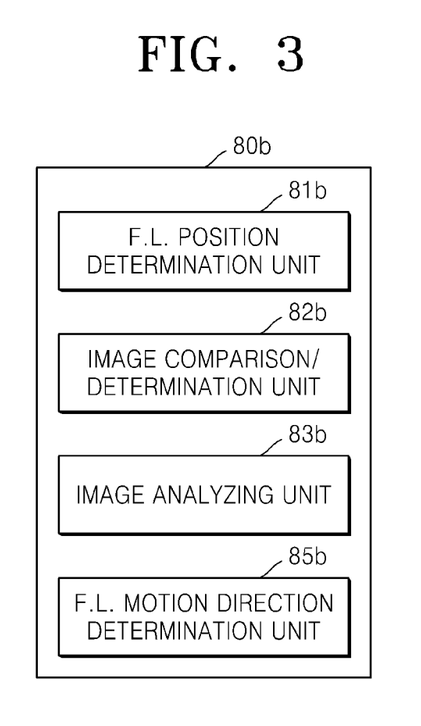
FIG. 3 is a block diagram of another example of the AF controller of the digital photographing apparatus of FIG. 1.

FIGS. 2 and 3 are block diagrams of examples of the AF controller 80 of the digital camera of FIG. 1.

Referring to FIG. 2, an AF controller 80a according to an embodiment of the invention includes a focus lens position determination unit 81a for determining whether a current position of the focus lens is a position for long range focusing or a position for close range focusing, an image analyzing unit 83a for determining whether a first image input at the current position of the focus lens has image blurring, and a focus lens motion direction determination unit 85a for determining whether a motion direction of the focus lens is a direction toward longer range focusing when the current position of the focus lens is a position for close range focusing and the first image has image blurring, and for determining whether a motion direction of the focus lens is toward a closer range focusing when the current position of the focus lens is a position for long range focusing and the first image has image blurring.

When the current position of the focus lens is a position for close range focusing and the first image does not have image blurring, the focus lens motion direction determination unit 85a determines that the motion direction of the focus lens is toward closer range focusing, and when the current position of the focus lens is a position for long range focusing and the first image does not have image blurring, the focus lens motion direction determination unit 85a determines that the motion direction of the focus lens is a direction toward longer range focusing (or a direction toward focusing on a subject at a longer range.)

Referring to FIG. 3, an AF controller 80b according to another embodiment of the invention includes a focus lens position determination unit 81b for determining whether a current position of the focus lens is a position for long range focusing or a position for close range focusing, an image comparison/determination unit 82b for determining whether a second image input after a photographing apparatus including the focus lens is moved is the same scene image as a first image input before the movement of the photographing apparatus including the focus lens, an image analyzing unit 83b for determining whether the first image has image blurring, and if the image comparison/determination unit 82b determines that the first image and the second image are different images, further determining whether the second image has image blurring, and a focus lens motion direction determination unit 85b for determining the motion direction of the focus lens in consideration of image blurring with respect to the second image on the basis of a changed position of the focus lens if the first image and the second image are different images, when the focus lens has been moved in a motion direction that had been determined in consideration of image blurring with respect to the first image.

In detail, if the focus lens has been moved towards a subject at a far distance in consideration of image blurring of the first image (towards longer range focusing), the focus lens motion direction determination unit 85b may determine that the motion direction of the focus lens is a direction toward a closer range focusing if the first image and the second image are different scene images and the second image has image blurring. If the focus lens has been moved towards a subject at a close distance in consideration of image blurring of the first image (towards closer range focusing), the focus lens motion direction determination unit 85b may determine that the motion direction of the focus lens is towards longer range focusing when the first image and the second image are different scene images and the second image has image blurring.

In addition, if the focus lens has been moved towards the subject at the far distance in consideration of image blurring of the first image (towards longer range focusing), the focus lens motion direction determination unit 85b may determine that the motion direction of the focus lens is towards a longer range focusing when the first image and the second image are different scene images and the second image does not have image blurring. If the focus lens has been moved towards a close distance in consideration of image blurring of the first image (towards closer range focusing), the focus lens motion direction determination unit 85b may determine that the motion direction of the focus lens is a towards closer range focusing when the first image and the second image are different scene images and the second image does not have image blurring.

In addition, the focus lens motion direction determination unit 85b may control the focus lens to be moved within a given range from the changed position of the focus lens that has been moved in consideration of image blurring of the first image, or for the focus lens not to be moved when the first image and the second image are the same scene.

Also, the focus lens position determination unit 81b may determine the position of the focus lens when the second image is input. That is, the focus lens position determination unit 81b may determine a changed position of the focus lens. The focus lens position determination unit 81b may determine the position of the focus lens when the second image is input, if the first image and the second image are different images.

The focus lens motion direction determination unit 85b may determine that the motion direction of the focus lens is toward close range focusing if the changed position of the focus lens is a long range position and the second image has image blurring, and may determine that the motion direction of the focus lens is toward longer range focusing if the changed position of the focus lens is in a close range and the second image has image blurring.

The focus lens motion direction determination unit 85b may determine that the motion direction of the focus lens is towards longer range focusing if the changed position of the focus lens is a long range position and the second image does not have image blurring, and may determine that the motion direction of the focus lens is toward closer range focusing if the changed position of the focus lens is a close range position and the second image does not have image blurring.

Figure 4:
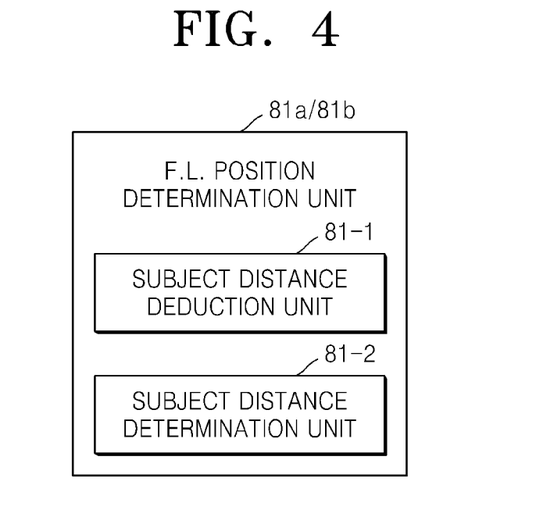
FIG. 4 is a block diagram of an example of focus lens position determination units illustrated in FIGS. 2 and 3.

FIG. 4 is a block diagram of an example of the focus lens position determination units 81a and 81b illustrated in FIGS. 2 and 3.

Referring to FIG. 4, the focus lens position determination unit 81a or 81b may include a subject distance deduction unit 81-1 for assuming and deducing a distance between the current position of the focus lens and a subject, and a subject distance determination unit 81-2 for determining that a subject is positioned at a close distance when the distance is shorter than a reference distance and determining that a subject is positioned at a far distance when the distance is longer than a reference distance. The positioning of a subject at the close distance corresponds to positioning of the focus lens in the close range position, and the positioning of a subject at the far distance corresponds to positioning of the focus lens in the long range position.

Figure 5:
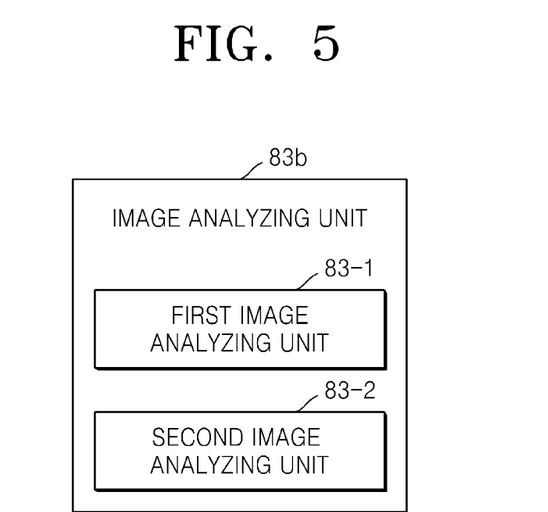
FIG. 5 is block diagram of an example of an image analyzing unit of FIG. 3.

FIG. 5 is block diagram of an example of the image analyzing unit 83b of FIG. 3.

Referring to FIG. 5, the image analyzing unit 83b may include a first image analyzing unit 83-1 for determining whether the first image has image blurring, and a second image analyzing unit 83-2 for determining whether the second image has image blurring. The focus lens motion direction determination unit 85b may determine whether each image has image blurring and if image blurring occurs, determines whether the motion direction of the focus lens is a direction allowing the position of the focus lens to belong to a second reference range that is opposite to a first reference range to which the current position of the focus lens belongs. For example, the current position of the focus lens belongs to the first reference range, when the first image has image blurring, the motion direction of the focus lens may be determined as a direction allowing the focus lens to belong to the second reference range. In addition, when image blurring with respect to the first image is determined and the changed position of the focus lens belongs to the second reference range, or when image blurring with respect to the second image is determined and the second image has image blurring, the motion direction of the focus lens may be determined as a direction allowing the focus lens to move to belong to the first reference range.

Figure 6:
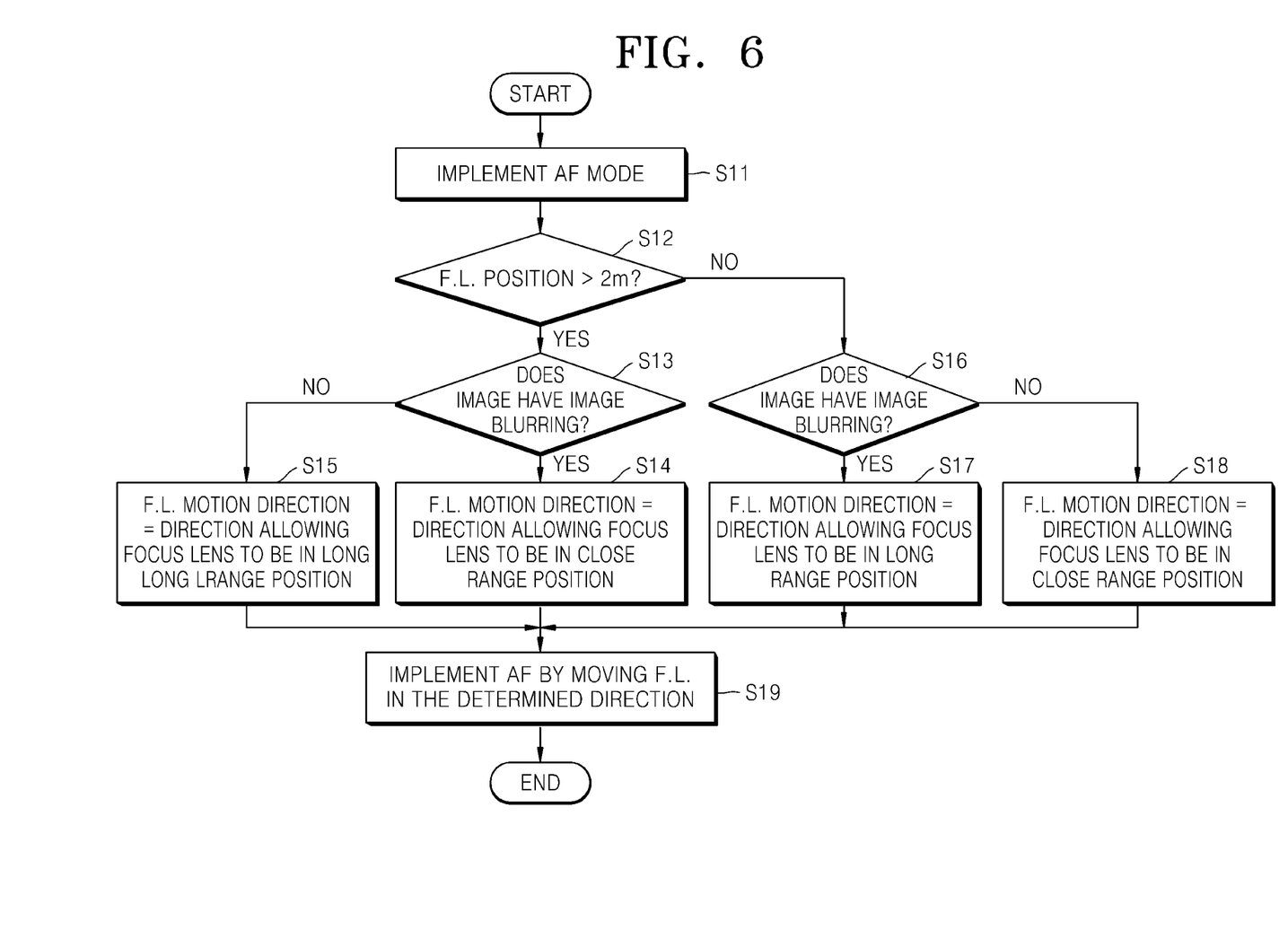
FIG. 6 is a flowchart for explaining an auto focusing method according to an embodiment of the invention.

FIG. 6 is a flowchart for explaining an auto focusing method according to an embodiment of the invention.

Referring to FIG. 6, first, an auto focusing mode is implemented (S11).

A distance between the current position of the focus lens and a subject is compared with a predetermined reference distance. For example, it is determined whether the distance is greater than 2 m (S12).

If the current position of the focus lens is a long range position (a position for long range focusing), that is, the distance is greater than 2 m, it is determined whether an image input at the current position of the focus lens has image blurring (S13).

The image blurring may be determined by referring to histogram distribution of the image and comparing with a predetermined reference. The image blurring may be determined according to methods illustrated in FIGS. 8 and 10. In this regard, image blurring may be evaluated with respect to an image corresponding to the entire focus region, and also with respect to an image corresponding to an auto focusing region. In addition, image blurring may be evaluated using a differential filter.

If image blurring occurs, it is determined that the motion direction of the focus lens is a direction allowing the focus lens to belong to a close range (S14) (toward a closer range focusing). If image blurring does not occur, it is determined that the motion direction of the focus lens is a direction allowing the focus lens to belong to a long range (S15) (toward a longer range focusing).

If the current position of the focus lens is a close range position, that is, the distance is smaller than 2 m, it is determined whether an image input at the current position of the focus lens has image blurring (S16). If image blurring occurs, it is determined that the motion direction of the focus lens is a direction allowing the focus lens to belong to a long range (S17) (toward longer range focusing). If image blurring does not occur, it is determined that the motion direction of the focus lens is a direction allowing the focus lens to belong to a close range (S18) (toward shorter range focusing).

Then, auto focusing is implemented by moving the focus lens in the determined direction (S19).

Figure 7:
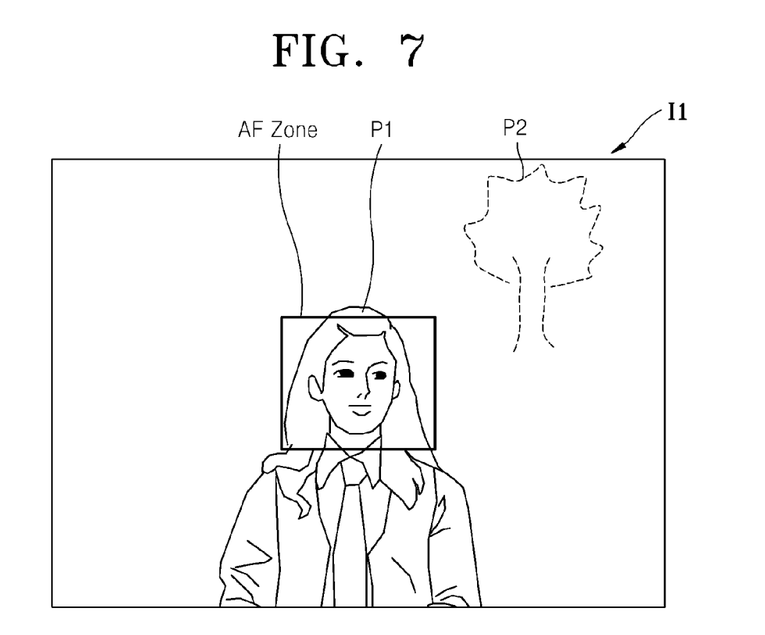
FIG. 7 shows an image including a near subject positioned in an AF zone.
Figure 8A:
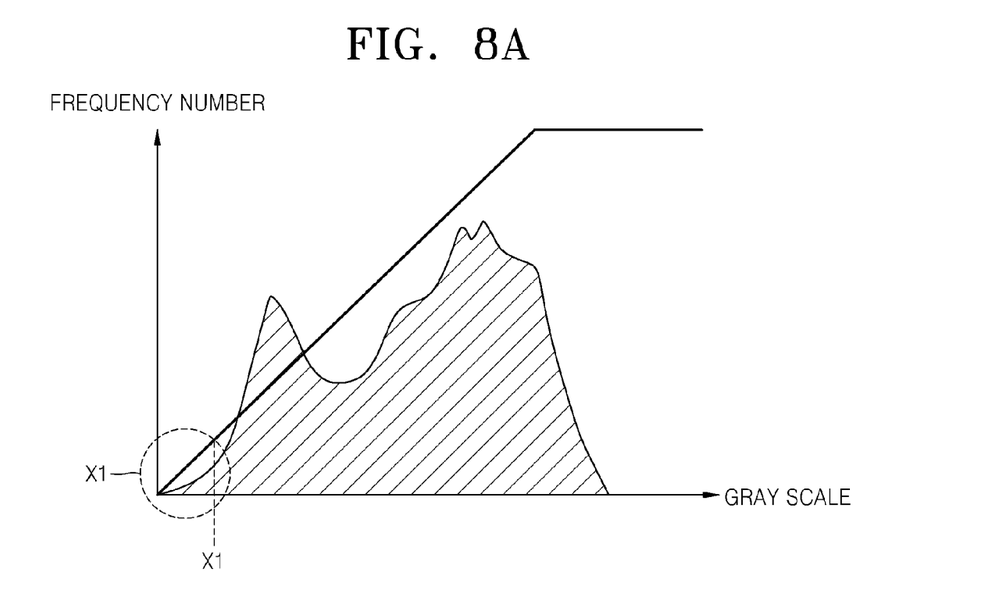
FIG. 8A is a histogram distribution graph of an image corresponding to the AF zone of FIG. 7.
Figure 8B:
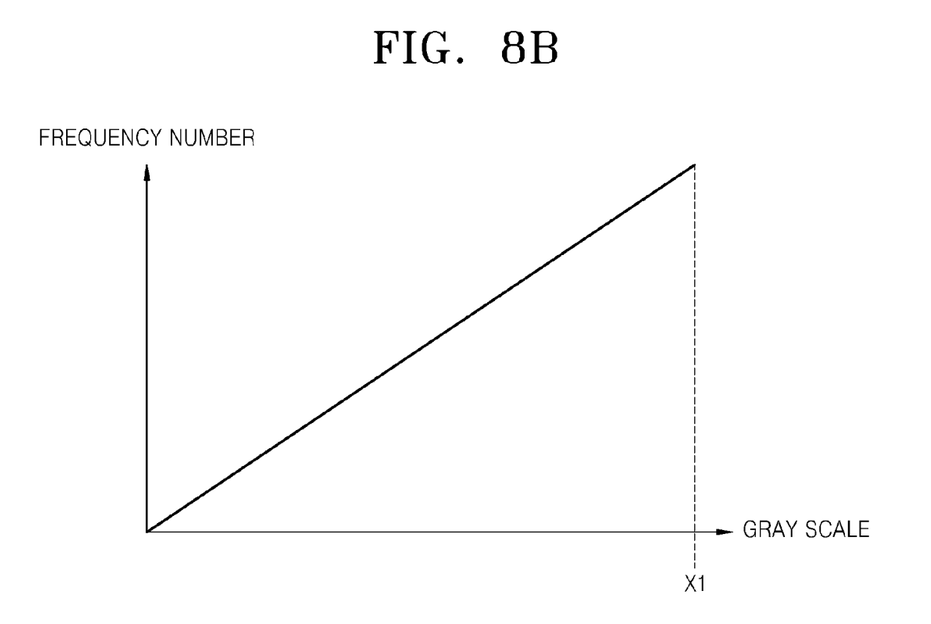
FIG. 8B is an enlarged view of the histogram distribution of a zone illustrated in FIG. 8A.

FIG. 7 shows an image including a near subject positioned in an AF zone, FIG. 8A is a histogram distribution graph of an image corresponding to the AF zone of FIG. 7, and FIG. 8B is an enlarged view of the histogram distribution of an X1 zone illustrated in FIG. 8A. According to an embodiment of the embodiment, the current position of the focus lens is a close range position (a position for close range focusing). The current position of the focus lens may be a position that is set as a default when an auto focusing mode begins, or a position that is changed after previous auto focusing is implemented.

In detail, FIG. 7 shows an image 11 that is input at the current position of the focus lens and includes one woman as a first subject P1 and one tree as a second subject P2. The first subject P1 is a near subject, and the second subject P2 is a distant subject. The first subject P1 is positioned in the AF zone.

The histogram distribution of the AF zone is illustrated in FIG. 8A. In detail, FIG. 8A is a graph of a frequency number with respect to a gray scale in the AF zone. Referring to FIG. 8A, the frequency number varies according to a gray scale. In particular, by referring to FIG. 8B that is an enlarged view of the X1 zone of the histogram distribution, it can be seen that even when the gray scale is close to 0, which corresponds to a dark zone, a particular distribution appears. That is, it is determined that the histogram distribution is relatively large and accordingly, the AF zone is an image that does not have image blurring. A standard histogram distribution may be determined based on a user's experience. Thus, if the histogram distribution is wider than the standard histogram distribution, it is determined that a near subject is positioned in the AF zone and that the motion direction of the focus lens is a direction allowing the focus lens to be in a close range position.

According to another embodiment of the invention, a distant subject may be positioned in the AF zone.

Figure 9:
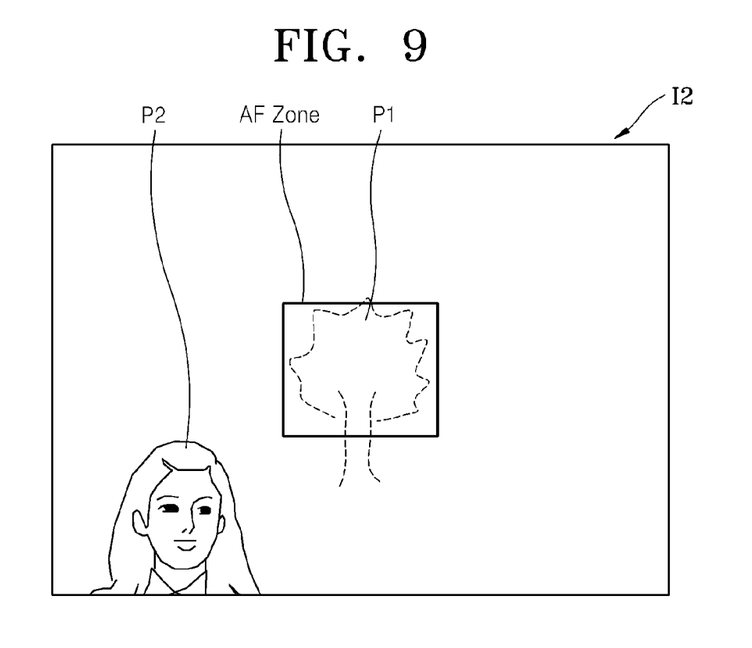
FIG. 9 is an image including a distant subject positioned in an AF zone.
Figure 10A:
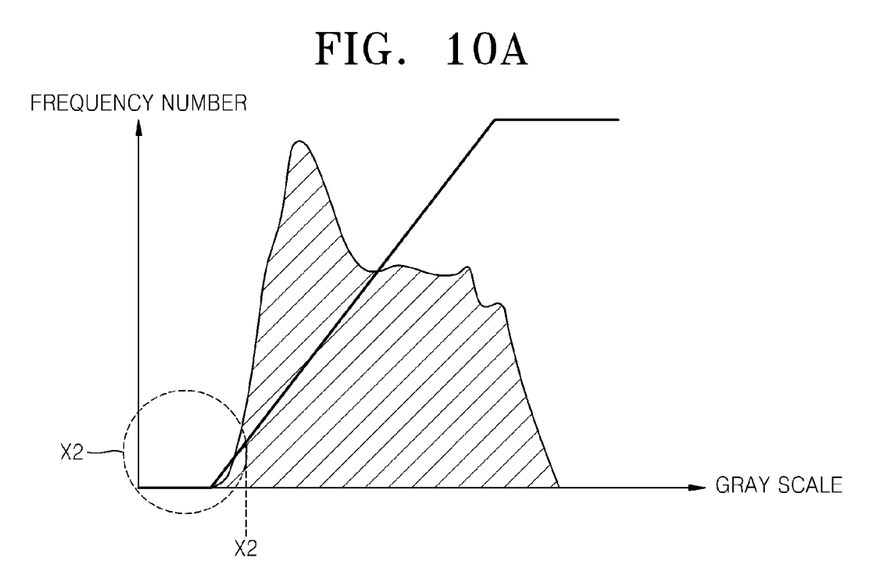
FIG. 10A is a histogram distribution graph of an image corresponding to the AF zone of FIG. 9.
Figure 10B:
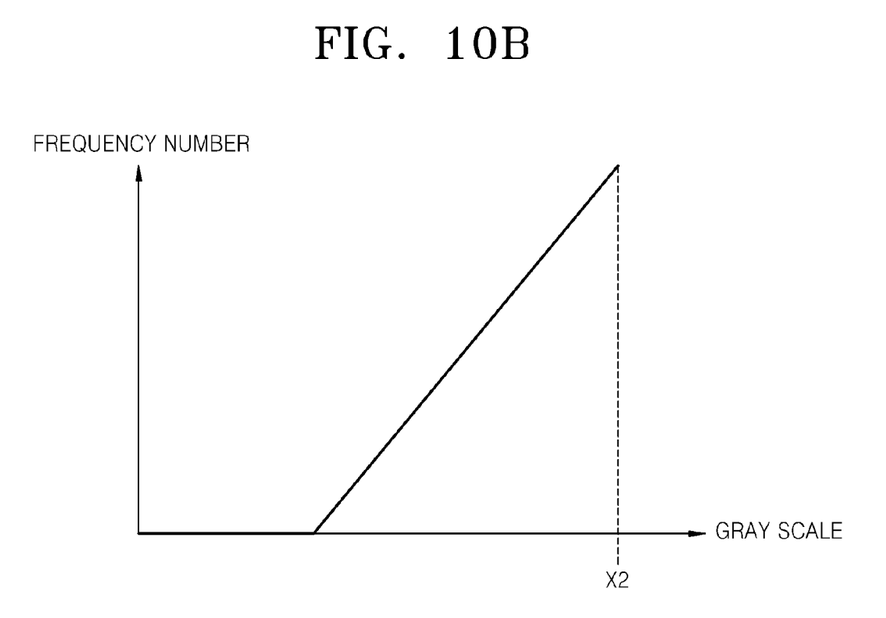
FIG. 10B is an enlarged view of the histogram distribution of an X2 zone illustrated in FIG. 10A.

FIG. 9 is an image including a distant subject positioned in an AF zone. FIG. 10A is a histogram distribution graph of an image corresponding to the AF zone of FIG. 9, and FIG. 10B is an enlarged view of the histogram distribution of an X2 zone illustrated in FIG. 10A. Like in the previous embodiment, in the current embodiment, it is assumed that the current position of the focus lens is a close range position.

First, referring to FIG. 9, an image 12 that is input at the current position of the focus lens includes one woman and one tree. The tree is a first subject P1 at a far distance, and the woman is a second subject P2 at a close distance. The first subject P1 is positioned in the AF zone. The histogram of the image corresponding to the AF zone is illustrated in FIG. 10A. The X2 zone of FIG. 10A is enlarged in FIG. 10B. Referring to FIGS. 10A and 10B, the image corresponding to the AF zone does not include a gray scale value that corresponds to a dark zone. That is, it can be seen that the histogram distribution is relatively narrower than the histogram distribution of the image corresponding to the AF zone of FIG. 7. As described with reference to FIG. 7, the histogram distribution is compared with a standard histogram distribution and if the histogram distribution is narrower than the standard histogram distribution, it is determined that the image corresponding to the AF zone of FIG. 9 has image blurring. Accordingly, since the first subject P1 positioned in the AF zone is a distant image and the current position of the focus lens is a close range position (a position for close range focusing), it is determined that the motion direction of the focus lens is a direction allowing the focus lens to be in a long range position (toward a longer range focusing).

Figure 11:
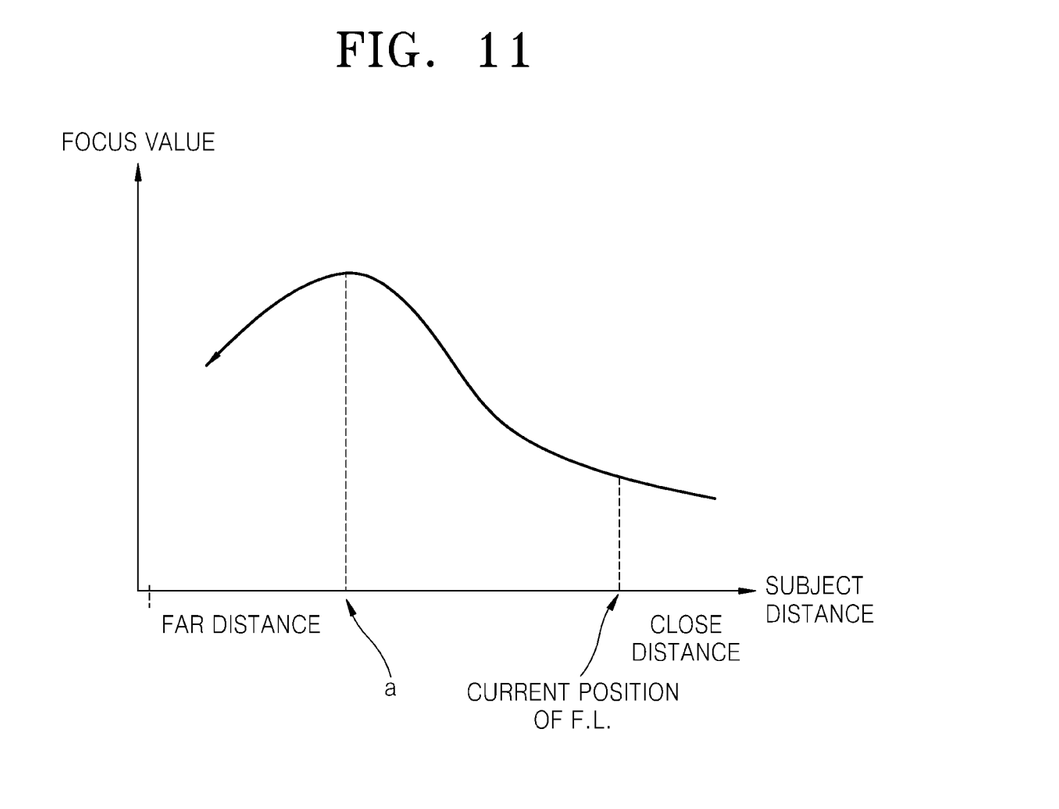
FIG. 11 is a graph of focus values with respect to a subject distance in an image of an AF zone of FIG. 9.

In detail, referring to FIG. 11, the histogram distribution of the image corresponding to the AF zone at the current position of the focus lens was evaluated and then it is determined that the image has image blurring, and accordingly, an in-focus image is obtained when the current position of the focus lens is a long range position. Thus, the focus lens may be moved in a direction allowing the focus lens to be in a long range position, so that the focus lens is moved to a position (corresponding to distance a of a subject) in order to obtain the in-focus image.

Figure 12A:
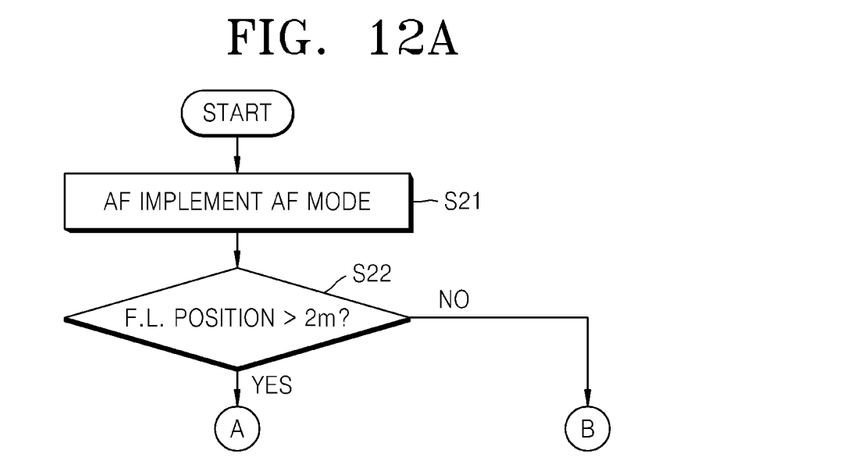
FIGS. 12A through 12C are a flowchart of an auto focusing method according to another embodiment of the invention.
Figure 12B:
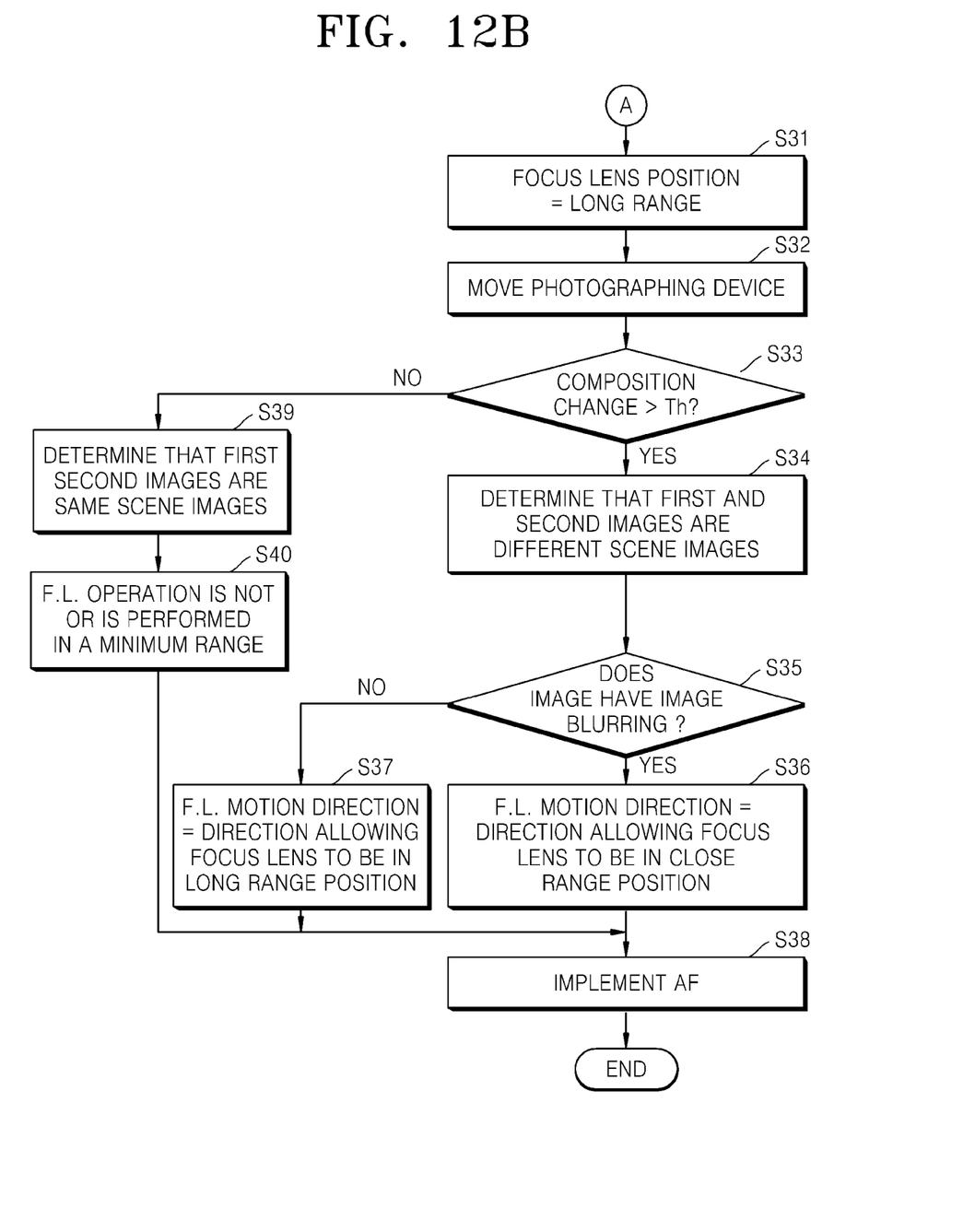
Figure 12C:
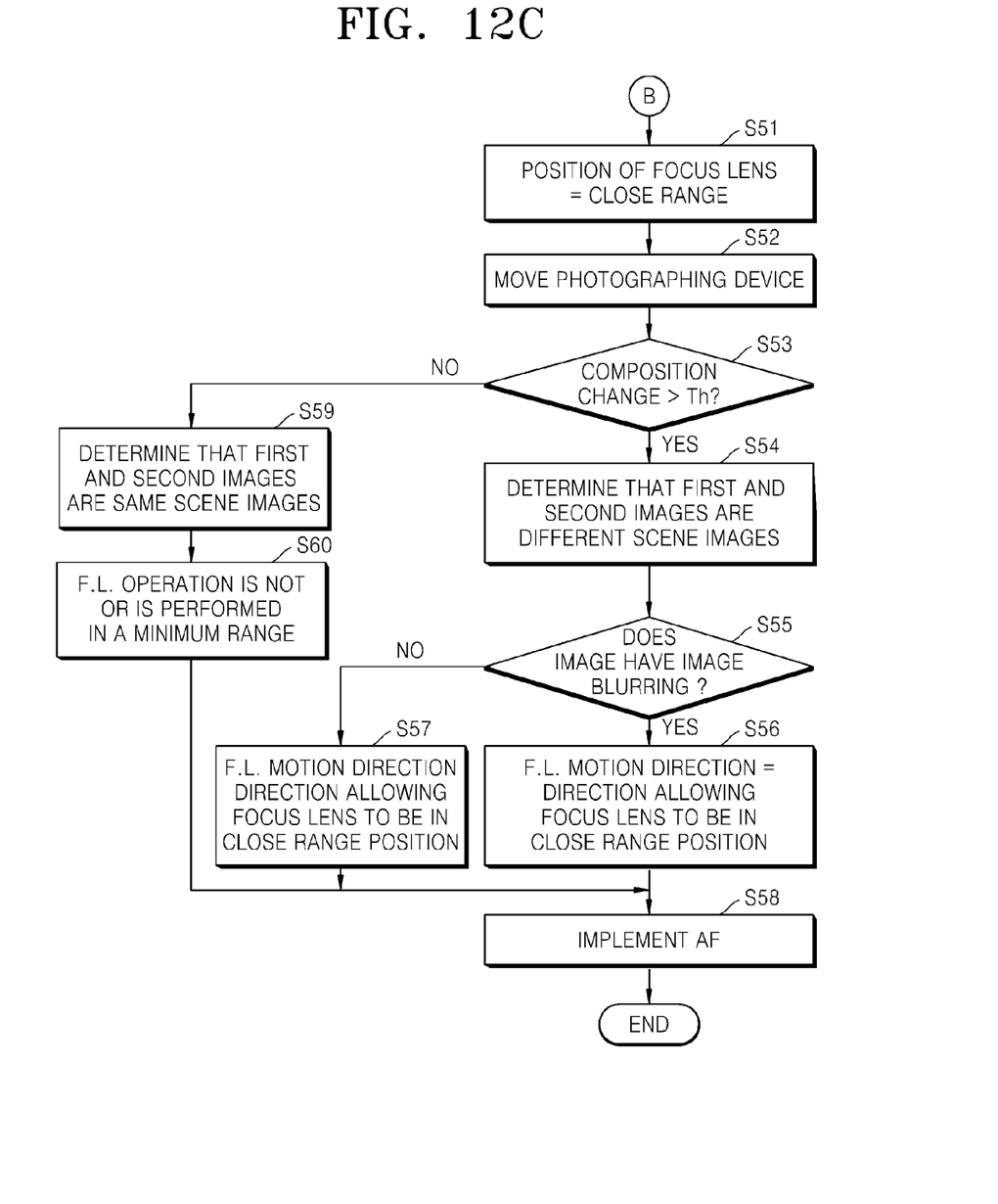

FIGS. 12A through 12C are a flowchart of an auto focusing method according to another embodiment of the invention. The auto focusing method according to the current embodiment may be reliable than the auto focusing method according to the previous embodiment in terms of determining the motion direction of the focus lens.

Referring to FIG. 12A, an auto focusing mode is implemented (S21). Then, it is determined that the current position of the focus lens is a long range position (S22). This determination operation corresponds to an operation for determining whether the distance between the current position of the focus lens and a subject belongs to a long range, for example, that the distance is greater than 2 m. However, the current embodiment is not limited thereto, and the determination operation may also be implemented with respect to a close range.

The position of the focus lens may be a position set as a default when an auto focusing mode begins. However, according to the current embodiment, the position of the focus lens is a position that is changed by determining whether a first image input at a previous position of the focus lens has image blurring and implementing auto focusing correspondingly. Thus, the changed position of the focus lens is determined by performing pre-auto focusing.

The position of the focus lens may be deduced by sensing the current position of the focus lens, or by sensing the position of a subject by using, for example, ultraviolet rays. Alternatively, the changed position of the focus lens, due to previous auto focusing, may be stored and then deduced and determined as the position of the focus lens.

If the distance between the current position of the focus lens and a subject is greater than 2 m, that is, the current position of the focus lens is a long range position, FIG. 12B may be referred to. In addition, if the distance between the current position of the focus lens and a subject is smaller than 2 m, that is, the current position of the focus lens is a close range position (a position for short range focusing), FIG. 12C may be referred to.

Referring to FIG. 12B, it is determined that the current position of the focus lens is a long range position (S31).

A photographing apparatus is moved (S32). In embodiments, the photographing apparatus is moved by moving the focus lens. After the photographing apparatus is moved, a second image is input at the current position of the focus lens.

The first image is compared with the second image. This comparison operation corresponds to comparing a composition change of the second image with respect to the first image (S33) with a reference Th. The comparison determination of the first image and the second image may be implemented by determining whether the composition is changed by image matching. For example, the composition change may be identified by comparing subjects of the first and second images in terms of a featured characteristic or image pattern information. If the degree of composition change is higher than the reference Th, it is determined that the first and second images are different scene images (S34).

If it is determined that the first and second images are different scene images, it is determined whether the second image has image blurring (S35). Although the image blurring may be evaluated with respect to the entire second image, the image blurring may also be evaluated with respect to an AF zone of the second image. In consideration of a process rate, it is better to evaluate image blurring with respect to an image corresponding to the auto focusing zone. If the second image has image blurring, it is determined that the motion direction of the focus lens is a direction allowing the focus lens to belong to a close range (S36) (toward a closer range focusing), and if the second image does not have image blurring, it is determined that the motion direction of the focus lens is a direction allowing the focus lens to belong to a long range (S37) (toward longer range focusing).

Then, auto focusing is implemented by moving the focus lens in the determined motion direction of the focus lens (S38).

When the first image is compared with the second image and the composition change is smaller than the reference Th, it is determined that the first and second images are the same scene images (S39). If it is determined that the first and second images are the same scene images, it is determined that operation of the focus lens is unnecessary or the focus lens needs to undergo a minimum operation (S40). The minimum operation may be set in advance. Auto focusing is implemented according to the motion direction or operation method of the focus lens, which has been determined as described above (S38).

Referring to FIG. 12C, if the distance between the current position of the focus lens and a subject is smaller than 2 m in FIG. 12A, it is determined that the current position of the focus lens is a close range position (S51).

A photographing apparatus is moved (S52). A second image at the current position of the focus lens may be input by moving the photographing apparatus. The first image is compared with the second image and it is determined whether the degree of composition change is greater than the reference Th (S53). If the difference between the first image and the second image, that is, the degree of composition change is greater than the reference Th, it is determined that the first and second images are different scene images (S54).

If it is determined that the first and second images are different scene images, it is determined whether the second image has image blurring (S55). The image blurring may also be evaluated with respect to an image corresponding to an AF zone in the second image. If the second image has image blurring, it is determined that the motion direction of the focus lens is a direction allowing the focus lens to belong to a far distance (S56) (toward longer range focusing). If the second image does not have image blurring, since the current position of the focus lens is a close range position, it is determined that the motion direction of the focus lens is a direction allowing the focus lens to belong to a close distance (S57) (toward closer range focusing).

If the composition change between the first image and the second image is smaller than the reference Th, it may be determined that the first image and the second image are the same scene images (S59).

If it is determined that the first image and the second image are the same scene images, operation of the focus lens is unnecessary or the focus lens needs to undergo a minimum operation (S60). The minimum operation may be set in advance.

Auto focusing is implemented according to the motion direction or operation method of the focus lens, which has been determined as described above (S58).

Embodiments of the invention can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium may be limited to physical medium. The computer readable recording medium can also be distributed over network coupled computer systems so that the computer readable code is stored and executed in a distributed fashion. Also, functional programs, codes, and code segments for accomplishing embodiments of the invention can be easily construed by programmers of ordinary skill in the art to which the invention pertains.

While embodiments of the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An auto focusing method comprising:
   determining a current position of a focus lens before moving the focus lens;
   determining whether a first image input at the current position of the focus lens has image blurring using a histogram distribution of the first image;
   if the current position of the focus lens is a position for close range focusing and the first image has image blurring, determining that a motion direction of the focus lens is toward longer range focusing;
   if the current position of the focus lens is a position for long range focusing and the first image has image blurring, determining that the motion direction of the focus lens is toward closer range focusing;
   if the current position of the focus lens is the close range position and the first image does not have image blurring, determining that the motion direction of the focus lens is toward closer range focusing; and
   if the current position of the focus lens is the long range position and the first image does not have image blurring, determining that the motion direction of the focus lens is toward longer range focusing.

2. The auto focusing method of claim 1, wherein determining a current position of a focus lens comprises:
   calculating a distance between the current position of the focus lens and a subject;
   if the distance is smaller than a reference distance, determining that the subject is positioned at a close distance, and
   if the distance is greater than the reference distance, determining that the subject is positioned at a far distance.

3. The auto focusing method of claim 2, wherein
   if the subject is determined to be positioned at the far distance, then determining that the current position of the focus lens is the long range position, and
   if the subject is determined to be positioned at the close distance, then determining that the current position of the focus lens is the close range position.

4. The auto focusing method of claim 1, further comprising:
   moving the focus lens in the determined motion direction;
   inputting a second image;
   determining whether the second image and the first image are the same scene images;
   if the second image and the first image are different scene images, determining whether the second image has image blurring;
   if the determined motion direction was toward longer range focusing and the second image has image blurring, determining that a second motion direction is toward closer range focusing; and
   if the determined motion direction was toward closer range focusing and the second image has image blurring, determining that a second motion direction is toward longer range focusing.

5. The auto focusing method of claim 4, further comprising:
   if the determined motion direction was toward longer range focusing and the second image does not have image blurring, determining that a second motion direction is toward longer range position; and
   if the determined motion direction was toward closer range focusing and the second image does not have image blurring, determining that the second motion direction is toward closer range focusing.

6. The auto focusing method of claim 4, further comprising:
   if it is determined that the first and second images are the same scene images, moving the focus lens within a predetermined range of the moved focus lens.

7. The auto focusing method of claim 1, further comprising:
   moving the focus lens in the determined motion direction;
   determining a changed position of the moved focus lens;
   inputting a second image;
   determining whether the second image and the first image are the same scene images;
   if the second image and the first image are different scene images, determining whether the second image has image blurring;
   if the changed position of the moved focus lens is for long range focusing and the second image has image blurring, determining that a second motion direction of the focus lens is toward closer range focusing; and
   if the changed position of the moved focus lens is for close range focusing and the second image has image blurring, determining that the second motion direction of the focus lens is toward longer range focusing.

8. The auto focusing method of claim 7, wherein
   if the changed position of the moved focus lens is for long range focusing and the second image does not have image blurring, determining that the second motion direction is toward longer range focusing; and
   if the changed position of the moved focus lens is for close range focusing and the second image does not have image blurring, determining that the second motion direction is toward closer range focusing.

9. The auto focusing method of claim 7, further comprising:
   if it is determined that the first and second images are the same scene images, moving the focus lens within a predetermined range from the changed position of the moved focus lens.

10. The auto focusing method of claim 1, wherein the step determining whether a first image input at the current position of the focus lens has image blurring, comprises:
    determining a histogram distribution for an intensity scale of pixels of the first image;
    if the histogram distribution is narrower than a predetermined histogram distribution then determining that the first image has image blurring; and
    if the histogram distribution is wider than a predetermined histogram distribution then determining that the first image does not have image blurring.

11. A non-transitory recording medium on which the auto focusing method of claim 1 is recorded as a computer readable program code.

12. An auto focusing apparatus comprising:
    a focus lens;
    a focus lens motor for driving the focus lens;
    a focus lens position determination unit for determining whether a current position of the focus lens before driving the focus lens is a long range position or a close range position;
    an image analyzing unit for determining whether a first image input at the current position of the focus lens has image blurring using a histogram distribution of the first image;
    a focus lens motion direction determination unit for determining that the motion direction of the focus lens is a direction allowing the focus lens to be in the long range position when the current position of the focus lens is the close range position and the first image has image blurring, for determining that the motion direction of the focus lens is a direction allowing the focus lens to be in the close range position when the current position of the focus lens is the long range position and the first image has image blurring, for determining when the current position of the focus lens is the close range position and the first image does not have image blurring that the motion direction of the focus lens is a direction allowing the focus lens to be in the close range position, and for determining when the current position of the focus lens is the long range position and the first image does not have image blurring that the motion direction of the focus lens is a direction allowing the focus lens to be in the long range position.

13. The auto focusing apparatus of claim 12, wherein the focus lens position determination unit comprises:
   a subject distance deduction unit for assuming and deducing a distance between the current position of the focus lens and a subject;
   a subject distance determination unit for determining that a subject is positioned at a close distance when the distance is shorter than a reference distance and determining that a subject is positioned at a far distance when the distance is longer than a reference distance.

14. The auto focusing apparatus of claim 13, wherein the positioning of a subject at the close distance corresponds to positioning of the focus lens in the close range, and the positioning of a subject at the far distance corresponds to positioning of the focus lens in the long range.

15. The auto focusing apparatus of claim 12, further comprising:
   an image comparison/determination unit for determining whether a second image that is input after a photographing apparatus comprising the focus lens is moved, is the same scene image as the first image,
   wherein if it is determined that the first and second images are different scene images, the image analyzing unit further determines whether the second image has image blurring, and
   when the focus lens is moved to be in the long range position in consideration of image blurring with respect to the first image and the second image has image blurring, the focus lens motion direction determination unit determines that the motion direction of the focus lens is a direction allowing the focus lens to be in the close range position, and when the focus lens is moved to be in the close range position in consideration of image blurring with respect to the first image and the second image has image blurring, the focus lens motion direction determination unit determines that the motion direction of the focus lens is a direction allowing the focus lens to be in the long range position.

16. The auto focusing apparatus of claim 15, wherein when the focus lens is moved to be in the long range position in consideration of image blurring with respect to the first image and the second image does not have image blurring, the focus lens motion direction determination unit determines that the motion direction of the focus lens is a direction allowing the focus lens to be in the long range position, and when the focus lens is moved to be in the close range position in consideration of image blurring with respect to the first image and the second image does not have image blurring, the focus lens motion direction determination unit determines that the motion direction of the focus lens is a direction allowing the focus lens to be in the close range position.

17. The auto focusing apparatus of claim 15, wherein the focus lens motion direction determination unit determines whether the second image and the first image are the same scene images and determines that the first and second images are the same scene images, the focus lens is moved within a predetermined range from the changed position of the focus lens that has been made with respect to the first image or is not moved.

18. The auto focusing apparatus of claim 12, further comprising:
   an image comparison/determination unit for determining whether a second image that is input after a photographing apparatus comprising the focus lens is moved, is the same scene image as the first image,
   wherein the focus lens motor moves the focus lens in a motion direction of the focus lens that is determined in consideration of image blurring of the first image, and
   the focus lens position determination unit determines the changed position of the focus lens, and
   if the image comparison/determination unit determines that the first and second images are different scene images, the image analyzing unit further determines whether the second image has image blurring, and
   when the changed position of the focus lens is the long range position and the second image has image blurring, the focus lens motion direction determination unit determines that the motion direction of the focus lens is a direction allowing the focus lens to be in the close range position, and when the changed position of the focus lens is the close range position and the second image has image blurring, the focus lens motion direction determination unit determines that the motion direction of the focus lens is a direction allowing the focus lens to be in the long range position.

19. The auto focusing apparatus of claim 18, wherein when the changed position of the focus lens belongs to the long range and the second image does not have image blurring, the focus lens motion direction determination unit determines that the motion direction of the focus lens is a direction allowing the focus lens to be in the long range position, and when the changed position of the focus lens is the close range position and the second image does not have image blurring, the focus lens motion direction determination unit determines that the motion direction of the focus lens is a direction allowing the focus lens to be in the close range position.

20. The auto focusing apparatus of claim 18, wherein if the image comparison/determination unit determines that the first and second images are same scene images, the focus lens motion direction determination unit determines such that the focus lens is moved within a predetermined range from the changed position of the focus lens that has been made with respect to the first image or is not moved.

* * * * *